(12) United States Patent
Chaffin

(10) Patent No.: US 6,932,912 B2
(45) Date of Patent: Aug. 23, 2005

(54) WASTEWATER TREATMENT SYSTEM FOR RESIDENTIAL SEPTIC SYSTEMS

(76) Inventor: Mark N. Chaffin, 1514 Dodge Rd., Wallis, TX (US) 77485

(*) Notice: Subject to any disclaimer, the term of this patent is extended or adjusted under 35 U.S.C. 154(b) by 0 days.

(21) Appl. No.: 10/370,343

(22) Filed: Feb. 18, 2003

(65) Prior Publication Data
US 2003/0155311 A1 Aug. 21, 2003

Related U.S. Application Data
(60) Provisional application No. 60/358,112, filed on Feb. 19, 2002.

(51) Int. Cl.[7] ................................ C02F 1/76; C02F 9/00
(52) U.S. Cl. ................. 210/754; 210/765; 210/138; 210/194; 210/205; 210/256; 210/532.2
(58) Field of Search ............................ 210/754, 755, 210/756, 765, 138, 143, 194, 198.1, 205, 256, 532.2; 422/37

(56) References Cited

U.S. PATENT DOCUMENTS

| | | | |
|---|---|---|---|
| 3,133,877 A | | 5/1964 | Mixer et al. |
| 3,975,284 A | | 8/1976 | Lambert |
| 4,256,552 A | * | 3/1981 | Sweeney ................... 205/511 |
| 4,333,833 A | | 6/1982 | Longley et al. |
| 4,381,240 A | * | 4/1983 | Russell ...................... 210/746 |
| 4,419,233 A | * | 12/1983 | Baker ........................ 210/169 |
| 4,818,412 A | | 4/1989 | Conlan |
| 5,413,706 A | * | 5/1995 | Graves ....................... 210/110 |
| 5,547,589 A | * | 8/1996 | Carroll, II .................. 210/747 |
| 5,976,384 A | | 11/1999 | Campbell et al. |
| 5,993,753 A | * | 11/1999 | Davidson ................... 422/275 |
| 6,200,472 B1 | * | 3/2001 | Donald et al. ........... 210/195.1 |
| 6,627,071 B1 | * | 9/2003 | Braden ...................... 210/121 |

FOREIGN PATENT DOCUMENTS
GB 2169660 A * 7/1986

* cited by examiner

Primary Examiner—Frank M. Lawrence
(74) Attorney, Agent, or Firm—Douglas W. Rommelmann; Andrews Kurth LLP

(57) ABSTRACT

A liquid chlorine supply canister is connected by a supply tube and venturi chamber to a recirculating pipe that discharges into a storage-mixing tank into which sewage effluent is received from a source. The supply tube is provided with a filter/orifice assembly. A pump causes circulation of sewage effluent through the venturi chamber and develops a suction in the supply tube which draws chlorine through the filter/orifice assembly and into the flowing sewage effluent stream. A recirculation pipe from the venturi chamber into the tank, causes turbulence of sewage effluent and dissolved chlorine (either solution or gaseous) within the tank for efficient mixing of the chlorine component with the constituents of the sewage effluent. A crossover tubing is connected with the pump discharge pipe and the recirculation pipe and enhances the induction of chlorine (disinfected) effluent into an effluent discharge pipe leading to a spray field.

24 Claims, 2 Drawing Sheets

WASTEWATER TREATMENT SYSTEM FOR RESIDENTIAL SEPTIC SYSTEMS

CROSS-REFERENCE TO RELATED APPLICATION

This application claims priority from U.S. Provisional Application No. 60/358,112, filed Feb. 19, 2002 by Mark N. Chaffin, and entitled Wastewater Treatment System For Residential Septic Systems, which is incorporated herein by reference for all purposes.

BACKGROUND OF THE INVENTION

1. Field of the Invention

The present invention relates generally to aerobic-type septic systems typically utilized for residential and commercial treatment concerning the disposal of wastewater effluent discharged after being processed by aerobic or other similar methods of treatment. More particularly, the present invention concerns a wastewater treatment system incorporating a liquid recirculation system, a liquid solution containing chlorine as a chlorine supply, a venturi and metering orifice for limiting the proper dosage of chlorine solution into the system; and efficiently mixing the chlorine with the effluent at a rate determined by the size of the orifice; and the flow rate through the venturi.

2. Description of the Prior Art

Storage-mixing tanks and wastewater circulation systems are in current use for handling the wastewater effluent of the septic systems of residences, and other small volume establishments, especially for circumstances when it is not possible or practical to achieve connection to a municipal sewage treatment system. For purposes of the present invention the term "residential septic system" is intended to encompass any small volume septic system whether residential or not, where sewage effluent is treated and is ultimately conducted to a subsurface drainage field or spray field, permitting its absorption into the soil.

An aerobic septic system incorporates a series of tanks or vessels which may be located above ground, below ground or partly exposed above ground. The tank or vessel of the present invention is typically known as a storage-mixing tank, which receives the clarified but still bacteria laden sewage effluent discharge of the home or other building. A pump is typically located within the sewage effluent tank and periodically is energized for pumping collected wastewater to a drainage field or spray field for sanitary disposal. The wastewater entering a typical sewage effluent tank is caused to flow across a chamber containing a chlorine compound in tablet form so that the wastewater dissolves the compound, and thereby is disinfected by absorbed chlorine gas before disposal within the spray field.

SUMMARY OF THE INVENTION

A supply tank or canister of liquid containing an aqueous solution of chlorine hereafter referred to as "chlorine canister" located in or near the storage-mixing tank and a chlorine solution supply tubing hereafter referred to as "chlorine supply tubing" (shown as a ¼" line) is connected from the chlorine canister to a venturi chamber. The chlorine supply tubing within the canister is provided with a filter/orifice assembly having an orifice dimension that is designed for the size of the wastewater treatment system. It should be borne in mind that the term "canister" is used to mean a container or vessel of any suitable size, which contains a volume of chlorine, either in liquid solution or gaseous form, and which can be serviced or refilled when the supply of chlorine becomes low. As will become apparent, the canister may be located adjacent to the storage-mixing tank or within the tank as desired.

A pump within the storage-mixing tank, or having its inlet or suction opening in communication with the storage-mixing tank causes circulation of sewage effluent, also referred to herein as wastewater, through a venturi chamber (also designed according to the size of the treatment system). The flow of wastewater through the venturi (restrictor disc) develops a significant drop in pressure in the venturi chamber, which is less than atmospheric pressure, allowing the atmospheric pressure to push chlorine solution from the storage canister, through the filter and orifice assembly, the supply tubing, and into the flowing treated effluent stream. The layman term for this phenomenon is referred to as "suction." A ½"–1" recirculation pipe section extends from the venturi chamber into the storage-mixing tank, and has a terminal end defining an opening that is oriented to cause turbulence or circulation of wastewater and chlorine within the tank for efficient mixing of liquid and dissolved solid (typically NOT seen by the naked eye) constituents of the sewage effluent. A 1" I.D. pipe from the pump of the storage-mixing tank carries the treated effluent to the spray field. The bi-directional recirculating crossover tubing enhances the induction of chlorinated water into the pipe to the disposal area.

A second aspect of the invention, which can be used in combination with the liquid chlorine supply system, is a timed irrigation valve in the treated effluent discharge pipe to the spray field. This valve is normally closed so that effluent recirculation is forced, causing the contact time of the chlorine solution with the sewage effluent to provide maximum active bacteria (fecal count) reduction. The irrigation valve has a timer, or some other suitable type of control, that causes the valve to open periodically and permit flow of chlorinated effluent to the spray field, while also providing visible/audible alarm or dry contact closure if chlorine canister liquid level drops below a safe operable level and/or dissolved chlorine concentration level in the effluent drops below a safe sanitation level.

Some of the components, such as the storage-mixing tank are preferably buried for aesthetics of the residential lawn, but such is not necessary to the function of the system.

BRIEF DESCRIPTION OF THE DRAWINGS

So that the manner in which the above recited features, advantages and objects of the present invention are attained and can be understood in detail, a more particular description of the invention, briefly summarized above, may be had by reference to the preferred embodiment thereof which is illustrated in the appended drawings, which drawings are incorporated as a part hereof.

It is to be noted however, that the appended drawings illustrate only a typical embodiment of this invention, and are therefore not to be considered limiting of its scope, for the invention may admit to other equally effective embodiments.

IN THE DRAWINGS

Figure 1:
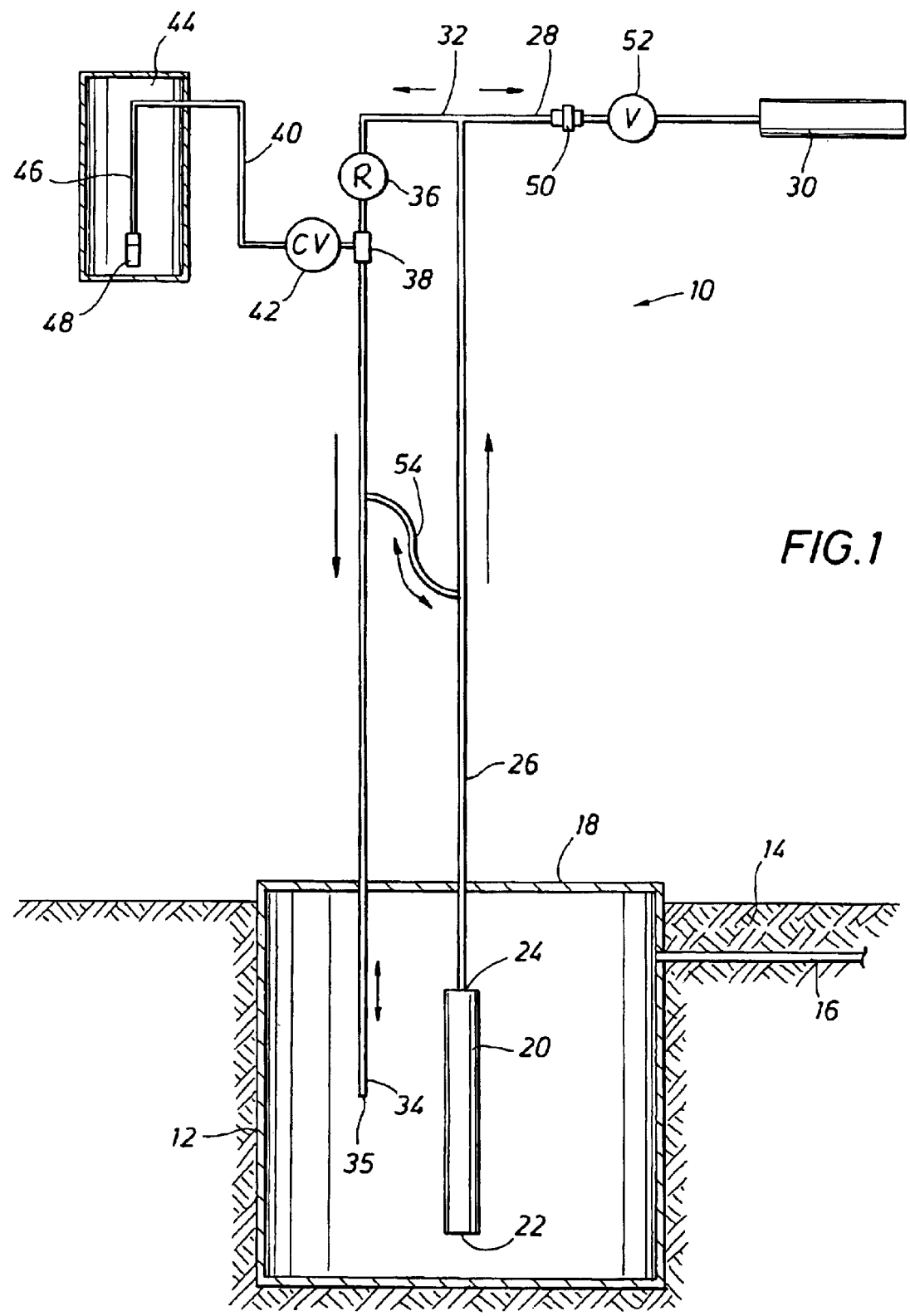
Figure 2:
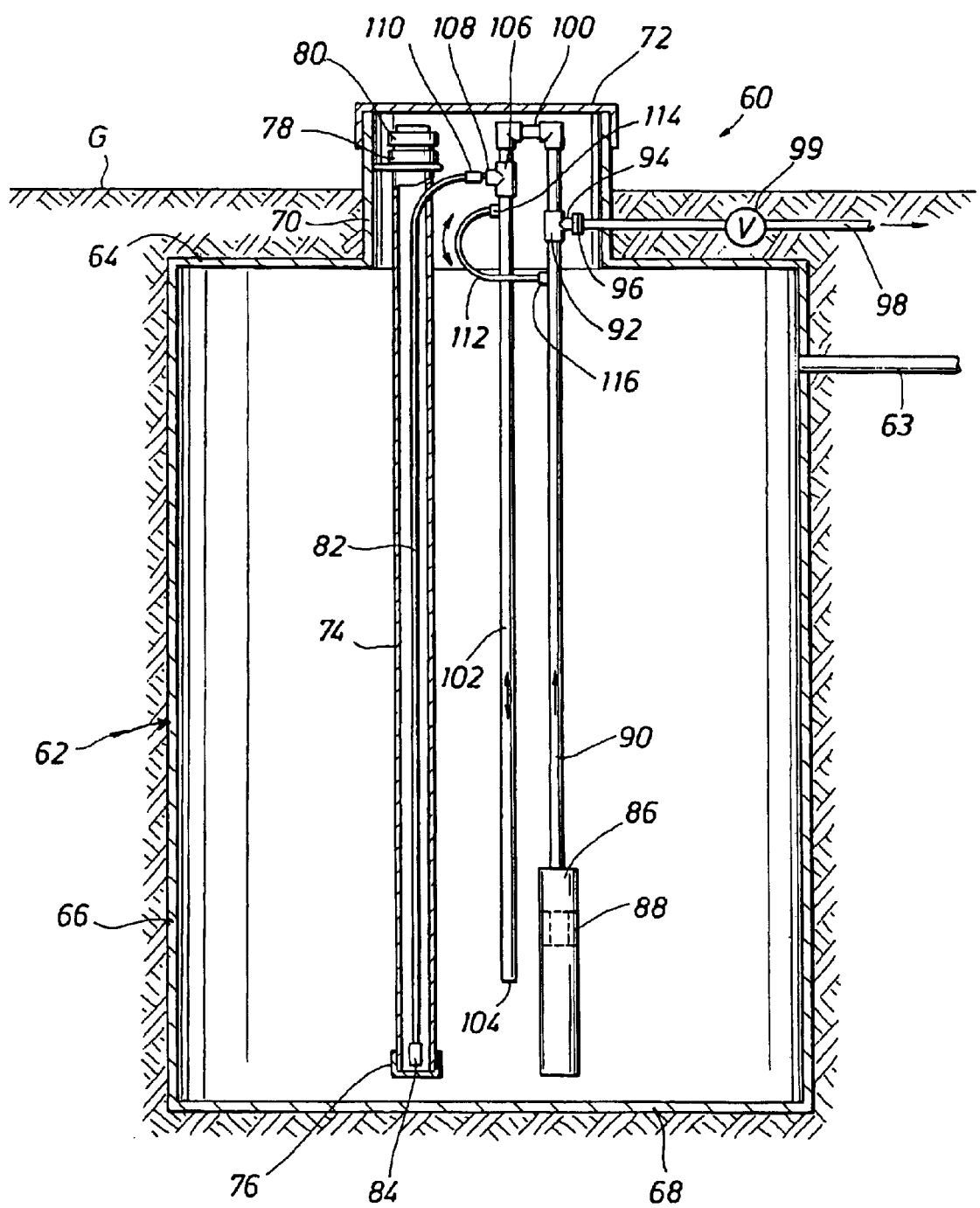

FIG. 1 of the drawings is a schematic illustration of a liquid chlorination treatment system for aerobic type septic systems which is constructed according to the teachings of the present invention; and FIG. 2 is a schematic illustration in section, showing a preferred embodiment of the present invention being installed below grade with a riser thereof accessible above grade for servicing and maintenance.

DETAILED DESCRIPTION OF PREFERRED EMBODIMENT

Referring now to the drawings and first to the schematic illustration of FIG. 1, a wastewater treatment system embodying the principal features of the present invention is shown generally at 10 and incorporates a storage-mixing tank 12 that is shown to be substantially buried within the soil 14, with a sewage supply pipe 16 conducting treated sewage effluent from the aerobic clarifier, effluent being transported into the storage-mixing tank 12, should contain primarily dissolved solids and bacteria, and appear clear (or nearly clear) to the naked eye. The storage-mixing tank 12 is provided with a top wall 18, which may be defined by a removable closure (cover) that may be removed to permit servicing of the storage-mixing tank system 12.

Within the storage-mixing tank 12 is mounted a pump 20, which is typically an electrically energized rotary pump having an inlet port 22 in communication with the storage-mixing tank 12 and a pump discharge pipe 26 in communication with the discharge opening 24 of the pump 20. The pump 20 may be located externally of the storage-mixing tank if desired, with its suction in communication with the interior of the tank and with its discharge in communication with an effluent recirculation system; however, it is deemed most practical to locate the pump within the storage-mixing tank. Typically for residential wastewater treatment systems, the pump discharge pipe will be a 1" I.D. pipe, but its dimension will be governed by the effluent handling capacity of the building or buildings being serviced by the sewage treatment system. Under typical or conventional circumstances, the pump discharge pipe will be connected to an effluent discharge pipe 28 which conducts treated wastewater effluent to a treated sewage disposal system, such as a spray field or a distribution field 30 for ultimate disposal. The disposal system typically utilizes a series of distribution pipes that conduct the effluent to a large disposal area (spray irrigation or subsurface disposal), permitting the effluent to slowly evaporate/dissipate into the soil.

According to the features of the present invention, an effluent recirculation pipe 32 is also connected to the pump discharge pipe 26, and is arranged with its terminal end 34, located such that discharge of circulating effluent returns back into the storage-mixing tank 12. A restrictor member, such as a restrictor disc 36, also identified by reference R, is connected into the effluent recirculation pipe 32, which is located downstream of the restrictor disc 36 for regulating the pressure of the effluent stream being directed back into the storage-mixing tank 12. A venturi chamber 38, such as a fitting (pipe tee) is also connected into a portion of the effluent recirculation pipe 32, with the pressure of flowing recirculating effluent also being directed through the venturi chamber 38. From the venturi chamber 38 extends a chlorine supply tubing 40 having a check-valve 42 that limits liquid flow direction in the suction tubing and into the venturi chamber and not vise versa.

The chlorine supply tubing 40 is communicated with a chlorine canister 44 which contains sufficient liquid chlorine solution to accommodate two to four months of use of the septic system before it will need to be refilled. The storage size of the chlorine canister will be designed to accommodate the volumetric effluent handling size of the septic system. A portion 46 of the chlorine supply tubing 40 extends through the wall of the chlorine supply canister 44 and terminates at an inlet end located close to the bottom wall of the chlorine supply canister 44.

Within the chlorine supply canister 44, the terminal or inlet end of the chlorine supply tubing 40 is affixed with a filter/orifice assembly 48. The filter/orifice assembly 48 includes a filter through which the liquid chlorine solution is drawn, and also an orifice that is sized according to the volumetric effluent handling size of the septic system. Thus, as the recirculating effluent flows through the venturi chamber 38, the suction, (described above), being applied to the suction tubing 40 will draw liquid chlorine solution into the suction tubing at a rate that is determined by the dimension of the orifice of the filter/orifice assembly 48. Due to the reduced pressure that is developed within the chlorine supply tubing 40 caused by higher pressure effluent being forced through restrictor orifice 36, then flowing through the enlarged venturi chamber 38; the liquid chlorine solution will as a result enter the venturi chamber and the recirculating pipe 32 and will flow along with the recirculating effluent, either sewage or a mixture of sewage and chlorine, into the storage-mixing tank. Partial mixing of the chlorine solution with the sewage effluent will occur in the venturi chamber 38 and in the recirculating pipe 34 downstream of the venturi chamber. The discharge opening 35 at the terminal end 34 of the recirculating pipe 32 will be arranged within the storage-mixing tank so as to develop turbulence within the storage-mixing tank 12. This turbulence will enhance mixing of the chlorine solution with the sewage effluent in the storage-mixing tank, and will under normal design conditions accomplish final disinfecting treatment of the sewage effluent before it is conducted to the spray or drain field 30. Typically, the sewage effluent within the storage-mixing tank will be recirculated for a sufficient period of time for efficient mixing of the chlorine with the sewage effluent and to accomplish disinfection of the treated sewage effluent before its disposal via a spray or disposal field or other disposal facility.

As mentioned above, though not necessary for operation of the chlorine treatment system, the effluent discharge pipe 28 may be provided with service disconnect unions 50 and a discharge flow control valve, such as an irrigation type valve 52 for enhancement of effluent/chlorine solution recirculation (mixing), and for control of treated effluent distribution to the spray or disposal fields 30. The valve 52 is preferably electrically operated and maybe timer or similarly controlled if desired so that at timed or otherwise prescribed intervals, determined by the fluid handling volume of the system, and/or the dissolved chlorine concentrations within the effluent, the valve can be opened periodically for treated or disinfected effluent discharge to the spray or disposal field.

A bi-directional recirculating supply crossover tubing 54 may be connected in communication with the pump discharge pipe 26 and in communication with a portion of the effluent recirculation pipe 32 downstream of the venturi chamber 38. The flow of effluent through the recirculating supply crossover tubing 54 enhances recirculation of the effluent to and from the storage-mixing tank and causes mixing of the chlorine solution within the effluent for efficient chlorine treatment of the effluent. Since the crossover tubing 54 has no valves, the flow of effluent through the crossover tubing can be either toward the pump discharge pipe 26 or toward the effluent recirculation pipe 32, depending on the operational characteristics of the chlorination system. Before the pump 20 is energized, effluent will be standing within the lower end of the recirculation pipe because the recirculation pipe extends below the surface level of the effluent within the storage-mixing tank. When the pump 20 is energized, the standing effluent within the lower end of the recirculation pipe represents a back-pressure, opposing pump discharge pressure and opposing flow within the recirculation pipe, until the standing effluent is cleared from the recirculation pipe in a few second time after pump start up. This back-pressure causes flow in the crossover tubing from the pump discharge pipe to the recirculation pipe. After the back pressure has been depleted by flow in the recirculation pipe and out the discharge opening 35, the direction of flow within the crossover tubing will reverse so that some of the fluid flowing in the recirculation pipe 32 will cross over and flow into the pump discharge pipe 26, where it causes additional mixing of chlorine with the flowing effluent. Thus, the recirculating supply crossover tubing 54 provides for substantially continuous recirculation of chlorine treated effluent within a portion of the pump discharge pipe 26 and a portion of the recirculation pipe to enhance the mixing of chlorine with the effluent. The flow of pumped effluent and chlorine through the recirculation pipe 34 and out its terminal end discharge opening 35 creates turbulence within the storage-mixing tank 12 to ensure efficient absorption/distribution of chlorine solution within the wastewater effluent and prevents the settling of solids within any of the pipes or within the storage-mixing tank.

Referring now to FIG. 2, the diagrammatic cross-sectional illustration of a preferred embodiment of the present invention is shown generally at 60. A storage-mixing tank 62 is shown to be buried in the earth with its top wall 64 located below a grade level G and is supplied with aerobically treated sewage effluent from a typical inlet pipe 63. The storage-mixing tank 62 incorporates a sidewall 66 to which a bottom wall 68 is connected. From the top wall 64 extends a riser section 70 of the storage-mixing tank. The riser extends above grade G, and preferably is provided with a removable closure (cover) 72 which prevents debris from entering the storage-mixing tank, and which is removable to facilitate servicing and/or repair of the chlorination system. The storage-mixing tank 62 and its closure (cover) 72 may be composed of any of a number of suitable materials, including metal, polymer, hard rubber, fiberglass, and the like.

Within the storage-mixing tank 62 is mounted a chlorine solution storage and supply canister 74 which may, if desired, be composed of a section of 4" or 6" internal diameter polyvinyl chloride (PVC) pipe. The chlorine storage canister is provided with a bottom closure 76 which may be in the form of a conventional PVC pipe cap. The upper end of the PVC chlorine solution storage canister 74 is provided with a threaded closure receptacle (male threaded adapter) 78 which receives a female threaded cap 80. The threaded cap 80 is removable from the closure receptacle 78 to permit the chlorine storage canister 74 to be charged with a suitable quantity of liquid chlorine solution so that the chlorination station will have a reasonable service life before recharging of the chlorine solution storage canister is needed. For example, the chlorine solution storage canister may contain a sufficient quantity of liquid chlorine solution to permit unattended operation of the chlorination station for a period of from 2 months to 4 months before the chlorine solution supply is substantially exhausted.

For dispensing of the liquid chlorine solution from the chlorine solution storage canister 74 a small dispensing tube 82 extends through the wall of the chlorine solution storage canister near its upper end and extends within the chlorine solution storage canister to a point near its lower end. The dispensing tube 82 may be composed of ¼" vinyl tubing if desired and is provided with a filter assembly 84 at its lower end. Within the filter assembly 84 is located an orifice fitting having an orifice that is of a dimension that is coordinated with the septic system to which it is applied. The orifice controls the volume of liquid chlorine solution that is drawn from the chlorine solution storage canister 74 in response to pump induced liquid flow.

Within the storage-mixing tank 62 is mounted a submersible pump 86 having an inlet port 88 that is in communication with the internal chamber of the pump tank. A pump discharge pipe 90 extends from the pump 86 vertically within the storage-mixing tank 62 and within the riser 70. The pump discharge pipe for a typical residential chlorination station may be composed of 1" I.D. PVC pipe or pipe of any other suitable material. A tee fitting (connection) 92 is connected to the upper portion of the pump discharge pipe 90, and a tee fitting 92 and has a discharge port connection 94. The discharge connection is connected to a union fitting 96 that is located in a beginning portion of a treated effluent discharge pipe 98 which extends to a spray field or other suitable disposal. The discharge pipe 98 may be provided with a discharge control valve 99 that is sequentially opened to permit pump pressure induced flow of treated effluent to a spray field or other suitable treated effluent disposal system. If a discharge control valve is employed, it will be sequentially controlled, such as by a timing system or any other suitable type of controller, so that the valve is automatically opened periodically to permit the discharge of treated effluent from the septic system. The union 96 permits the spray discharge pipe to be disconnected when servicing or repair of the chlorination station is needed.

The uppermost end of the pump discharge pipe 90 is provided with fitting elbows and piping or conduit sections (nipples) 100 (typical) which establish connection with a recirculation pipe 102. The recirculation pipe 102 is mounted in substantially parallel relation with the pump discharge pipe 90. As the pump 86 operates, fluid is forced through the recirculation pipe 102 with a portion of the fluid exiting the system via the spray field pipe 98 while the remainder of the pump discharge is conducted to the recirculation pipe 102 and then from the recirculation pipe 102 and the venturi chamber 106 back to the pump discharge pipe 90, via the crossover tubing 112, for recirculation into the storage-mixing tank. However, during a few seconds after pump start up, due to the back pressure of effluent standing within the recirculation pipe, as explained above, the direction of flow through the crossover tubing will be reversed, i.e., from the pump discharge pipe 90 to the recirculation pipe 102. After pump pressure has cleared the standing effluent from the recirculation pipe, which occurs within 10 to 15 seconds after pump start up, the flow within the crossover tubing will automatically reverse. Thus, when a discharge control valve is not employed in the spray field pipe 98, effluent circulation for efficient mixing of chlorine with the effluent can occur substantially simultaneously with discharge of treated effluent to the spray field. The lower end of the recirculation conduit is located at least 4" below the inlet port 88 of the pump thus permitting recirculated fluid, discharged from the recirculation pipe opening 104, to be directed to the bottom of the pump tank. This feature causes the development of significant turbulence within the storage-mixing tank to cause efficient mixing of the sewage effluent and the liquid chlorine solution that is drawn into the recirculating pipe by venturi suction from the chlorine solution storage and supply canister 74.

A fitting (suction) tee 106 is connected into the upper portion of the recirculation conduit 102 and has an inlet port connection 108 that is connected to the dispensing tube 82 of the chlorine solution storage and supply canister 74. A check valve 110 is also connected into a portion of the dispensing tube 82, located close to the fitting tee 106, to ensure unidirectional flow of liquid chlorine solution from the chlorine solution storage and supply canister 74 into the recirculation pipe 102 via the fitting tee 106. Thus, as pump induced flow occurs in the pump discharge pipe 90 and the recirculation pipe 102, liquid chlorine solution, controlled by the suction developed within the venturi chamber 106 and also controlled by the orifice of the filter and orifice assembly 84, is caused to flow into the recirculation pipe 102 and the storage-mixing tank 62 thereby being mixed with the effluent therein by the turbulence that is developed within the storage-mixing tank by pumped effluent and chlorine being ejected from the recirculation pipe opening 104.

A bidirectional recirculation crossover tubing 112, which may be composed of vinyl tubing, is connected to an upper portion of the pump discharge pipe 90 located below the discharge fitting 92 and to the recirculation pipe 102 such as by means of conventional barbed fittings 114 and 116. The recirculation crossover tubing 112 permits fluid pumped through the discharge pipe 90 to cross over and enter the recirculation pipe 102, and thus enhances the induction of chlorinated water into the pump discharge pipe 90 which has final communication with discharge pipe to spray field 98, as well as with the recirculation pipe, shown typically at 100 and 102 and thus into the internal chamber of the storage-mixing tank 62. The direction of flow through the crossover tubing is typically controlled by the open or closed condition of the treated effluent discharge valve 99 of the effluent discharge pipe 98

In view of the foregoing it is evident that the present invention is one well adapted to attain all of the objects and features hereinabove set forth, together with other objects and features which are inherent in the apparatus disclosed herein.

As will be readily apparent to those skilled in the art, the present invention may easily be produced in other specific forms without departing from its spirit or essential characteristics. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A method for treating sewage effluent, comprising:
   receiving within a mixing/storage tank sewage effluent from a source;
   pumping sewage effluent from the mixing/storage tank through a recirculation pipe receiving the sewage effluent discharge of the pump and having a discharge opening within the mixing/storage tank;
   pumping sewage effluent through a venturi chamber in communication with the recirculation pipe and developing a suction drawing chlorine from a chlorine supply canister into the venturi chamber and into the recirculation pipe;
   discharging sewage and chlorine from the recirculation pipe into the mixing/storage tank at a velocity creating turbulence and sewage effluent and chlorine mixing within the mixing/storage tank; and
   selectively causing flow of mixed sewage effluent and chlorine from the recirculation pipe to an effluent discharge pipe in connection with the recirculation pipe by opening a normally closed valve of the effluent discharge pipe and permitting pump induced flow of mixed sewage effluent and chlorine to a treated sewage effluent disposal system.

2. The method of claim 1, comprising:
   during application of suction within said chlorine supply canister by said venturi chamber, metering the suction induced flow of chlorine from the chlorine supply canister to the venturi chamber.

3. The method of claim 1, comprising:
   during application of suction within said chlorine supply canister, filtering the suction induced flow of chlorine from the chlorine supply canister.

4. The method of claim 1, comprising;
   selectively causing the flow of pumped mixed sewage effluent from said pump discharge to said recirculation pipe downstream of said venturi chamber for enhancing mixing of chlorine with the sewage effluent.

5. The method of claim 1, comprising:
   at timed/prescribed intervals opening a valve and conducting pump induced flow of chlorine treated sewage effluent from said recirculation pipe to a chlorine treated sewage effluent disposal system.

6. The method of claim 5, wherein said valve is an electrically operated valve, said method comprising:
   controlling electrical operation of said electrically operated valve with an electronic valve sequencing controller.

7. A wastewater treatment system for septic systems, comprising:
   a storage-mixing tank having an inlet for receiving sewage effluent from a source;
   a pump located within said storage-mixing tank and having an inlet opening and a pump discharge in said storage-mixing tank;
   a recirculation pipe within said storage-mixing tank receiving sewage effluent from said pump discharge and having a terminal end located within said storage-mixing tank and defining a recirculation discharge opening;
   a chlorine supply canister having an internal volume adapted to contain a supply of chlorine; and
   a venturi chamber in communication with said recirculation pipe;
   a chlorine supply tube having a first end and a second end, said tube first end in communication with said venturi chamber and said tube second end in constant fluid communication with substantially the entire contained chlorine supply in said internal volume of said chlorine supply canister,
   wherein as recirculating pumped sewage effluent flows through said venturi chamber, chlorine from said internal volume of said supply canister is continuously drawn into said venturi chamber and into said recirculation pipe.

8. The wastewater treatment system of claim 7, comprising:
   a metering orifice connected to said chlorine supply tube and metering the flow of chlorine from said chlorine supply canister into said chlorine supply tube.

9. A wastewater treatment system for septic systems, comprising:
   a storage-mixing tank having an inlet for receiving sewage effluent from a source;
   a pump having an inlet opening into said storage-mixing tank and having a pump discharge;

a recirculation pipe receiving sewage effluent from said pump discharge and having a terminal end located within said storage-mixing tank and defining a recirculation discharge opening;

a chlorine supply canister;

a venturi chamber being in communication with said recirculation pipe and being in communication with said chlorine supply canister and pumped sewage effluent flowing through said venturi chamber creates suction drawing chlorine from said chlorine supply canister and discharging chlorine into said venturi chamber and into said recirculation pipe and creates turbulent discharge of sewage effluent and chlorine into said storage-mixing tank for mixing of sewage effluent and chlorine;

a chlorine supply tube interconnecting said venturi chamber with said chlorine supply canister;

a metering orifice being connected to said inlet of said chlorine supply tube and metering the flow of chlorine from said chlorine supply canister into said chlorine supply tube; and a filter assembly being connected to said inlet of said chlorine supply tube and filtering the flow of chlorine from said chlorine supply canister into said chlorine supply tube.

10. A wastewater treatment system for septic systems, comprising:

a storage-mixing tank having an inlet for receiving sewage effluent from a source;

a pump having an inlet opening into said storage-mixing tank and having a pump discharge;

a recirculation pipe receiving sewage effluent from said pump discharge and having a terminal end located within said storage-mixing tank and defining a recirculation discharge opening;

a chlorine supply canister;

a venturi chamber being in communication with said recirculation pipe and being in communication with said chlorine supply canister and pumped sewage effluent flowing through said venturi chamber creates suction drawing chlorine from said chlorine supply canister and discharging chlorine into said venturi chamber and into said recirculation pipe and creates turbulent discharge of sewage effluent and chlorine into said storage-mixing tank for mixing of sewage effluent and chlorine;

a chlorine supply tube interconnecting said venturi chamber with said chlorine supply canister;

a metering orifice being connected to said inlet of said chlorine supply tube and metering the flow of chlorine from said chlorine supply canister into said chlorine supply tube; and a check valve being connected within said chlorine supply tube and permitting suction induced unidirectional flow of chlorine from said chlorine supply canister to said venturi chamber.

11. The wastewater treatment system of claim 7, comprising:

a restrictor member being connected within said recirculation pipe upstream of said venturi chamber and regulating the pressure of pump induced sewage effluent recirculation.

12. A wastewater treatment system for septic systems, comprising:

a storage-mixing tank having an inlet for receiving sewage effluent from a source;

a pump having an inlet opening into said storage-mixing tank and having a pump discharge;

a recirculation pipe receiving sewage effluent from said pump discharge and having a terminal end located within said storage-mixing tank and defining a recirculation discharge opening;

a chlorine supply canister;

a venturi chamber being in communication with said recirculation pipe and being in communication with said chlorine supply canister and pumped sewage effluent flowing through said venturi chamber creates suction drawing chlorine from said chlorine supply canister and discharging chlorine into said venturi chamber and into said recirculation pipe and creates turbulent discharge of sewage effluent and chlorine into said storage-mixing tank for mixing of sewage effluent and chlorine;

an effluent discharge pipe being connected with said recirculation pipe;

a treated sewage effluent disposal system being connected with said effluent discharge pipe and handling chlorine treated sewage effluent for disposal; and a timer controlled valve being connected in said effluent discharge pipe and being selectively opened for pump pressure induced discharge of chlorine treated sewage effluent to said treated sewage disposal system.

13. The wastewater treatment system of claim 12, comprising:

said treated sewage effluent disposal system being a distribution area distributing treated sewage effluent to the soil.

14. The wastewater treatment system of claim 7, comprising:

said chlorine supply canister being located in or adjacent to said storage-mixing tank and being accessible for service and refilling.

15. The wastewater treatment system of claim 7, comprising:

said chlorine supply canister being located at least partially within said storage-mixing tank and being accessible for service and refilling.

16. A wastewater treatment system for septic systems, comprising:

a storage-mixing tank having an inlet receiving sewage from a source;

a pump located within said storage-mixing tank and having a pump inlet opening into said storage-mixing tank and having a pump discharge;

a pump discharge pipe being connected with said pump discharge;

a recirculation pipe being connected with said pump discharge pipe and having a terminal end located within said storage-mixing tank and defining a recirculation discharge opening, a chlorine supply canister;

a venturi chamber being connected to said recirculation pipe and having a chlorine supply; tube having an inlet located within said chlorine supply canister and drawing chlorine from said chlorine supply canister into said venturi chamber and said recirculation pipe responsive to sewage effluent flow within said recirculation pipe and creating turbulent discharge of sewage effluent and chlorine into said storage-mixing tank;

an effluent discharge pipe being connected with said recirculation pipe;

a treated sewage effluent disposal system being connected with said effluent discharge pipe and handling treated sewage effluent for disposal; and an electrically operated controller sequenced valve being connected in said effluent discharge pipe and being selectively opened for pump pressure induced discharge of chlorine treated sewage effluent by said treated sewage effluent disposal system.

17. The wastewater treatment system of claim 16, comprising:

said treated sewage effluent disposal system being a distribution area distributing treated sewage effluent to the soil.

18. The wastewater treatment system of claim 16, comprising:

said chlorine supply canister being located adjacent to said storage-mixing tank and being accessible for service and refilling.

19. The wastewater treatment system of claim 16, comprising:

said chlorine supply canister being located within said storage-mixing tank and being accessible for service and refilling.

20. A method for treating sewage effluent in a storage tank containing a recirculation pipe and a pump connected to a discharge pipe and the recirculation pipe, the method comprising the steps of:

pumping sewage effluent through the recirculation pipe in communication with the discharge pipe, the recirculation pipe having a discharge opening within the storage tank;

pumping sewage effluent through a venturi chamber in communication with the recirculation pipe and developing a suction to continuously draw chlorine from a chlorine supply canister into the venturi chamber and into the recirculation pipe, the volume of chlorine drawn from the chlorine supply canister during a period of continuous sewage effluent recirculation varies with the duration period of continuous sewage effluent recirculation; and discharging sewage effluent and chlorine from the recirculation pipe into the storage tank at a velocity creating turbulence and sewage effluent and chlorine mixing within the storage tank.

21. The method of claim 20, further comprising the step of metering the chlorine volume drawn into the venturi chamber during the pumping of sewage effluent through the venturi chamber.

22. A wastewater treatment system for septic systems, comprising:

a storage-mixing tank having an inlet for receiving sewage effluent from a source;

a pump having an inlet opening into said storage-mixing tank and having a pump discharge;

a recirculation pipe receiving sewage effluent from said pump discharge and having a terminal end located within said storage-mixing tank and defining a recirculation discharge opening;

a chlorine supply canister having an internal volume adapted to contain a chlorine supply;

a venturi chamber in communication with said recirculation pipe and in communication with the chlorine supply in said internal volume of said chlorine supply canister; and a chlorine supply tube interconnecting said venturi chamber with said internal volume of said chlorine supply canister, said chlorine supply tube including an open end portion in continuous communication with substantially the entire amount of chlorine supply within said chlorine supply canister, wherein pumped sewage effluent flowing through said venturi chamber creates a suction continuously drawing chlorine from said chlorine supply canister and continuously discharging chlorine into the pumped sewage effluent flowing downstream through said venturi chamber.

23. The wastewater treatment system of claim 22, further comprising:

a metering orifice connected to said chlorine supply tube and metering the flow of chlorine from said chlorine supply canister into said chlorine supply tube.

24. The wastewater treatment system of claim 22, wherein said chlorine supply tube is in constant communication with the chlorine supply in said internal volume of said chlorine supply canister.

* * * * *